Patented Jan. 1, 1952

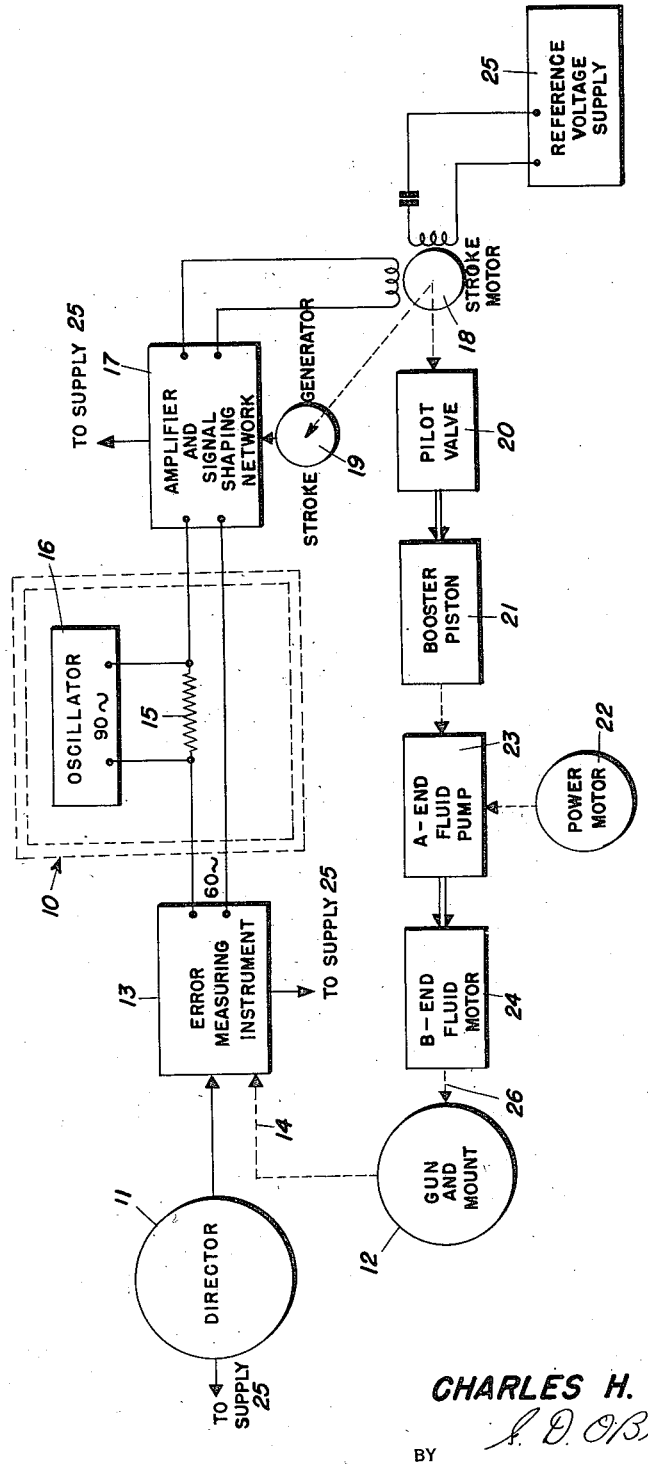

2,581,149

UNITED STATES PATENT OFFICE 2,581,149

FIRE CONTROL

Charles H. Shaw, Silver Spring, Md., assignor to the United States of America as represented by the Secretary of the Navy Application March 29, 1946, Serial No. 658,161

1 Claim. (Cl. 60—53)

The present invention relates to dithering arrangements, and, while it has a considerable range of prospective application, it is of particular utility in improving the operation of remote control systems such as those used in fire control for positioning a gun.

Remote control systems employed in fire control are generally of the continuous-control closed-cycle type and have the following principal components: (A) the controlling member, such as a gun director for determining the position to which the controlled member should be ordered; (B) the controlled member or gun; (C) a measuring instrument for producing a basic electrical error signal having a magnitude proportional to any deviation or departure of the actual position of the controlled member from the position ordered by the controlling member and a polarity indicative of the direction of the departure; (D) signal amplifying and shaping networks for amplifying the basic signal and/or modifying it in accordance with one or more functions of the deviation or departure, thereby to determine the characteristics of the control action desired; (E) an arrangement controlled by the resultant modified and/or amplified error signal for moving the controlled member in such manner as to eliminate the deviation or departure, thereby to bring the position of the controlled member into correspondence or synchronism with the position ordered by the controlling member.

Component (E) generally comprises an auxiliary source of power for moving the controlled member and regulating means responsive to the above-mentioned resultant signal for determining the rate and direction of application of power from that source to the controlled member. Units (D) and (E) together constitute a "follow-up" or "Servo" mechanism. Such a mechanism is essentially a power amplifying device in which the amplifier element or elements which drive the output are so actuated by the difference between input and output that the output element is driven in such a direction as to make that difference approach zero.

The immediate function of the amplified error signal, generally applied to a control winding of a reversible electrical stroke control motor, is to control the speed and direction of rotation of the motor rotor. In turn, the immediate function of the stroke motor is to control the linear motion of a pilot valve.

The motion of the pilot valve is hydraulically amplified by a booster piston. The latter has a null or neutral position and is so coupled to some conventional prime-moving arrangement (mechanically geared to the gun mount) as to cause the speed of the prime mover (and accordingly of the mount) to vary in accordance with the displacement of the booster piston from neutral and the direction of movement of the prime mover to vary in accordance with the direction of that displacement. Thus it will be seen that the amplified error signal determines the setting of a regulator and the latter determines the speed and direction of the error-correcting action.

For the purpose of superimposing a vibratory motion upon the motion of the pilot valve (which is governed by the resultant electrical signal hereinabove referred to) there is provided in accordance with the prior-art a dither methanism. This mechanism conventionally consists of a dither motor, a crank and arm, so arranged with respect to the mechanical linkage between the stroke control motor and the pilot valve as to impart to the latter the desired vibratory motion. Since the dither action is translated through the pilot valve, the booster, and the prime mover, to the gun mount, the entire hydraulic and mechanical system becomes more sensitive to movement of the stroke control system. The dither motor facilitates the maintenance of oil between moving parts of the various units of the remote control system, thus keeping them from settling and making metal-to-metal contact and reducing the undesirable effects of static friction. The dither action also decreases the error which would otherwise be allowed in synchronization by nullifying accumulative play between moving parts. This is accomplished by keeping the mount end of the series of moving parts at the mean of this possible error.

It is desirable to eliminate the dither motor and the complicated crank and arm arrangement which mechanically couple it to the pilot valve. Since the primary motion of the pilot valve in the exercise of its regulating function is dictated by the resultant signal hereinabove referred to, the invention is premised on the theory that the above mentioned resultant electrical signal may be modulated or modified in such manner as also to dictate the secondary or vibratory motion of the pilot valve and in this manner to avoid the necessity for the complicated dither motor mechanism.

It is, accordingly, an object of the invention to avoid the above-mentioned disadvantages and limitations of prior-art dithering arrangements by applying to the input of an existing control member a vibratory electric signal which is related in mechanical form at the output of that member, instead of supplying to the output of the control member a mechanical vibration signal produced by additional mechanical arrangements.

It is also an object of the invention to provide an improved dithering arrangement, involving a few simple components, economical in construction and reliable in operation.

For a better understanding of the present invention, together with other and further objects thereof, reference is made to the following specification and the claim appended thereto, taken in conjunction with the accompanying drawing, which:

The view is a block diagram of a complete continuous control gun mount power drive system, including a preferred form of dithering arrangement in accordance with the present invention.

The controlling member is a director 11, of any suitable conventional type, positioned in train, for example, by its crew, for establishing a line of sight on a selected moving or stationary target. The director is equipped with any suitable signal system for generating electrical order signals for the purpose of controlling the gun position in train. It is customary to employ an electrical generator of the "selsyn" or "synchro" type (not shown) for transmitting the order signal. The generator stator is fixed and the rotor is geared to the director in such a manner that there is transmitted to the power drive an electrical order signal for training the gun.

Also illustrated are the controlled gun and mount 12, likewise conventional in character, and designed to respond or to be turned in train to an actual position corresponding to the ordered position, to the end that a projectile fired from the gun will strike the target.

The power drive is of the closed-cycle type and it includes an error measuring instrument 13, electrically coupled to the director and mechanically geared to the mount by a suitable gear train indicated by the dashed line 14, for comparing electrical order and mechanical response, thereby to produce a basic electrical error signal proportional to and in response to a deviation or departure between the ordered position angle and the actual position angle of the gun in train, the polarity of the error signal indicating whether the correcting operation for effecting correspondence between mount and director involves clockwise or counterclockwise motion.

The error measuring instrument generally comprises a control transformer of the "selsyn" or "synchro" class (not shown) having its stator windings electrically coupled to the corresponding windings of the generator, and having its rotor mechanically geared to the gun mount 12 through the gears 14. The operation of the error measuring instrument, usually referred to as the "B-end synchro," is such that its rotor produces the above mentioned basic electrical error signal when the position of the mount departs from correspondence with the ordered position. As the correcting process progresses the gun mount moves the transformer rotor toward such a position that it is not cut by the magnetic field produced by the interaction of the generator and transformer, so that the error signal approaches zero and attains that limit when correspondence is effected.

All of the components illustrated in the drawing are conventional in character, with the exception of those included within the double dashed line and indicated generally by the numeral 10. Neglecting for the moment the construction and operation of unit 10, it will be assumed that the basic error signal is applied from measuring unit 13 directly to the input of a conventional amplifier and signal shaping network 17 coupled thereto. Unit 17 derives from the basic error signal a synchronizing signal having a magnitude related to error and one or more functions of error, according to the control action desired, and a polarity determined by the direction of the angular deviation between gun mount and director. There is coupled to the output of unit 17 a prior-art reversible electrical motor 18 of the drag cup induction type having one of its field windings connected to unit 17 and the other of its field windings connected through a phase-splitting capacitor to a reference voltage supply 25. The reference voltage supply is also coupled to the electrical generator in director 11, the transformer in measuring instrument 13, and amplifying unit 17, to the end that all of the various signals may be referred to the same voltage and made phase-significant so that the direction of rotation of the rotor of motor 18 may be determined by the direction of the deviation between gun and mount. Motor 18 is on a common shaft with a prior-art stroke generator 19 and drives the latter, causing it to produce an output damping signal which is fed back to the amplifying unit 17 through any suitable coupling network. The purpose of the damping signal is to stabilize the operation of stroke motor 18 and to prevent oscillations of the gun mount of such frequency as to delay or impair the accuracy of the response of the mount to orders from the director.

Stroke motor 18 converts the composite signal applied thereto from unit 17 into linear motion of a pilot valve 20. The latter is a prior-art device hydraulically coupled to and operatively determining the flow of oil to one side or the other of a conventional booster piston 21 (the booster piston functioning as a hydraulic amplifier to amplify the linear motion of the pilot valve).

The ultimate source of power for moving the mount comprises a constant-speed, high-power electrical motor 22, preferably of the three-phase, induction type. This motor is geared to an A-end fluid pump 23, included in the hydraulic system, and drives the pump in one direction at a constant speed. Pump 23 is hydraulically coupled by two pipe lines and the oil contained or flowing therein (not shown) to a B-end fluid motor 24, which in turn is geared to mount 12 by any suitable arrangement of gears indicated by the dashed line 26. Motor 24 is of the variable feed hydraulic type, such as the Vickers Model MF-38-2-S98, having an output speed and direction determined by the volume and direction of flow of oil delivered by pump 23. The pump is of the variable delivery hydraulic type, such as the Vickers Model TV-2003, so arranged as to supply oil to the motor at a rate determined by the difference between the angle between tilting and fixed members of the motor and the angle between tilting and fixed members of the pump. Each of units 23 and 24 comprises a fixed member and a tilting member (not shown). The angle between the motor members is fixed, but the pump tilting member is so mechanically linked to the booster piston 21 that the angle between the pump members is varied by movement of the booster piston. When the two angles are the same, as when the booster piston is on neutral, the fluid pump does not deliver any oil to the motor and the mount is stationary. When the angle between the pump members is larger than that between the motor members, as when the pilot valve is in an "out" position, the motor 24 moves the mount in one direction. When this angle is smaller than that between the motor members, as when the pilot valve is oppositely displaced from neutral and in an "in" position, the mount is moved in the opposite direction.

Units 20, 21, 22, 23, and 24 are individually and in their relationship to each other of the prior art and are hereinafter collectively treated as the "controlled power source," since they function in the aggregate to eliminate the departure between gun and director by moving the former toward correspondence. The controlled power source is so arranged that when the stroke motor is moving with constant velocity and the pilot valve is being displaced from neutral with constant velocity, the gun is being trained with constant acceleration. When the stroke motor is accelerating, the angular acceleration of the gun is increasing. When the stroke motor is stationary, and the pilot valve and booster piston are on neutral, the gun is in static correspondence with a stationary gun order from the director. When the stroke motor is stationary and the pilot valve on neutral but the booster piston is stationary and displaced from neutral, the gun is moving with constant velocity in dynamic synchronism with an order from the director. The expression "stationary" is not to be construed to preclude slight vibration due to the dither action.

The "controlled power source" is regulated by the movement of pilot valve 20. The latter performs its regulating function by causing the stroke of fluid pump 23 to be controlled. Therefore it is customary to refer to the signal transmitter included in director 11 as the signaling system, to units 13, 14, and 17 to 20, inclusive, (and their associated circuits) as the stroke control system, to units 22, 23, and 24 as the hydraulic system or auxiliary source of power, and to booster piston 21 as the connecting link between the stroke control system and the hydraulic system.

The operation of the illustrated system is such that a deviation or departure of the gun mount from correspondence with the director order signal is detected by error measuring instrument 13, which then generates a basic electrical signal indicative of the magnitude and direction of the error. This signal is electrically amplified in amplifier 17 and converted into rotary mechanical motion by stroke motor 18, which motion is in turn converted into the linear motion of pilot valve 20. When the voltage applied to the control winding of motor 18 is substantially 90° behind the reference voltage applied to the reference winding, the motor rotates in one direction. But when the control winding voltage is substantially 90° ahead of the reference winding voltage, the motor rotates in the opposite direction. The linear motion of the pilot valve is hydraulicaly amplified by booster piston 21 and utilized to regulate the behavior of the auxiliary power source. The result is that as soon as error apears in the system an appropriate correcting process is initiated and correspondence is restored. It will be seen that the system contains numerous mechanical components and gears. Their static friction and backlash or play impair the accuracy and rapidity of action of the remote control system. In order to eliminate static friction, to prevent this accumulative play, and to balance one such undesired factor off against another, to the end that gun and mount 12 will assume the mean position, the novel and improved dither arrangement 10 to which the description now returns, is provided in accordance with the present invention. Instead of superimposing upon the mechanical motion of the pilot valve 20 (i. e. the output of stroke motor 18) a mechanical vibratory signal, which expedient required the provision of a dither motor and complicated mechanical linkages, the invention is addressed to the application of electrical principles in superimposing upon the output motion of stroke motor 18 a vibratory motion. To this end, a resistor 15 is included in circuit between error measuring instrument 13 and amplifier 17. This resistor is coupled to the tank circuit of a conventional electronic vacuum tube oscillator 16, having an output signal frequency of, say, 90 cycles per second, related to the frequency of vibration desired and an output signal amplitude small in comparison to the magnitude of the basic carrier signal from instrument 13 which dictates the primary movement of motor 18. Oscillator 16 modulates at its frequency the basic carrier signal from unit 13, and both the oscillator output signal and the basic signal are combined in amplifier 17. Source 25 preferably has a frequency of the order of 60 cycles per second, so that the signal from the oscillator alternately leads and lags the reference signal applied to that phase of motor 18 which is coupled through the phase-splitting capacitor to source 25. Although the general direction of rotation of motor 18 is determined by the synchronizing signal component of amplifier 17, the output signal from oscillator 16 cyclically urges motor 18 in one direction and then in the other. When the gun mount is in correspondence with the director, the only signal component translated from unit 17 to the control winding of motor 18 is the amplified oscillator signal, so that the motor and pilot valve then have a slight vibratory motion. This slight vibratory motion as transmitted to the gun mount 12 through units 18, 20, 21, 23, 24 and 25 causes the mount to remain in the mean position of synchronism.

Likewise, when mount 12 is in dynamic synchronism with director 11 and moving at constant velocity with the director, the booster piston is vibrating about a position displaced from neutral, since no signal is then applied by amplifier 17 to motor 18, other than the amplified output signal of oscillator 16.

While there has been shown and described what is at present considered to be a preferred embodiment of the invention, it will be obvious to those skilled in the art that various modifications and changes may be made therein without departing from the true spirit of the invention, and it is, accordingly, intended in the appended claim, to cover all such changes and modifications as fall within the true scope of the invention and without the scope of the prior art.

What is claimed is:

Control apparatus for positioning a gun mount in accordance with electrical gun orders transmitted from a director including a stroke motor including a rotor and a stator, said stator having a control winding and a reference voltage winding energizable by a reference voltage of predetermined frequency, a hydraulic system comprising a fluid motor for driving said mount, electrically driven pump for supplying fluid said fluid motor, a booster piston mechanically ınected to said pump for controlling the fluid ivered therefrom in accordance with the ear position of said piston, a pilot valve hyıulically coupled to and operatively controlg the flow of fluid to said piston for position; said piston in accordance with the linear posin of said valve, means mechanically coupling d rotor to said valve for moving said valve early upon rotation of said stroke motor, an ;trument for generating an error signal of said ɛdetermined frequency and of a magnitude riable in accordance with the departure of ɛ actual position of said mount from the posin ordered by said director, and of a polarity licative of the direction of departure, an amfier for said error signal, a stroke generator nnected to said rotor, means for degeneratively ɛding the output of said stroke generator to id amplifier, means connecting said amplifier circuit with said control winding to rotate said tor in one or the other direction as determined by the phase relation between said amplifier error signal and said reference voltage, means for dithering the linear movement of the pilot valve comprising a thermionic oscillator having a voltage output of a frequency differing from said predetermined frequency and means for superimposing upon said error signal in circuit with said amplifier the output voltage of said oscillator.

CHARLES H. SHAW.

REFERENCES CITED

The following references are of record in the file of this patent:

UNITED STATES PATENTS

| Number | Name | Date |
| --- | --- | --- |
| 1,921,983 | Wittkuhns | Aug. 8, 1933 |
| 2,275,317 | Ryder | Mar. 3, 1942 |
| 2,368,701 | Borden | Feb. 6, 1945 |
| 2,388,769 | Shaffer | Nov. 13, 1945 |
| 2,409,190 | Brown | Oct. 15, 1946 |
| 2,412,027 | Alexanderson | Dec. 3, 1946 |